US009985546B2

(12) United States Patent
Jitaru

(10) Patent No.: US 9,985,546 B2
(45) Date of Patent: May 29, 2018

(54) METHOD AND APPARATUS FOR OBTAINING SOFT SWITCHING IN ALL THE SWITCHING ELEMENTS THROUGH CURRENT SHAPING AND INTELLIGENT CONTROL

(71) Applicant: Ionel Jitaru, Tucson, AZ (US)

(72) Inventor: Ionel Jitaru, Tucson, AZ (US)

(73) Assignee: ROMPOWER TECHNOLOGY HOLDINGS, LLC, Milford, DE (US)

( * ) Notice: Subject to any disclaimer, the term of this patent is extended or adjusted under 35 U.S.C. 154(b) by 0 days. days.

(21) Appl. No.: 15/068,598

(22) Filed: Mar. 13, 2016

(65) Prior Publication Data

US 2017/0012547 A1    Jan. 12, 2017

Related U.S. Application Data

(60) Provisional application No. 62/133,245, filed on Mar. 13, 2015.

(51) Int. Cl.
    *H02M 3/335*           (2006.01)
    *H02J 3/00*             (2006.01)
(52) U.S. Cl.
    CPC ........... *H02M 3/33592* (2013.01); *H02J 3/00* (2013.01); *H02M 3/3353* (2013.01); *H02M 3/33576* (2013.01)
(58) Field of Classification Search
    CPC ......... H02M 3/33538; H02M 3/33546; H02M 3/33515; H02M 3/33576; H02M 3/33553;
    (Continued)

(56) References Cited

U.S. PATENT DOCUMENTS

| | | | | |
|---|---|---|---|---|
| 2006/0279966 A1* | 12/2006 | Fan | ....................... | H02M 3/337 363/17 |
| 2007/0230228 A1* | 10/2007 | Mao | ..................... | H02M 3/156 363/89 |
| 2016/0020701 A1* | 1/2016 | Jitaru | ................ | H02M 3/33576 363/16 |

* cited by examiner

*Primary Examiner* — Timothy J Dole
*Assistant Examiner* — Bryan R Perez
(74) *Attorney, Agent, or Firm* — Yakov S. Sidorin; Quarles & Brady LLP

(57) ABSTRACT

A method is shown to create soft transition in selected topologies by preserving the leakage inductance energy during the dead time and using several techniques to supplement the energy require to discharge the parasitic capacitance of the primary switchers and obtain zero voltage switching. One technique consists in a current pulse injection across the synchronous rectifiers during the dead time and prior the turn off of the synchronous rectifiers. A second technique consist in tailoring the magnetizing current through frequency modulation to increase the energy in the leakage inductance and use that energy to discharge the parasitic capacitance of the primary switchers and at lighter load to have a magnetizing current which exceeds the current through the output inductor at the end of the dead time. The third technique is interleaving two converters and sharing a couple inductance in a way to lower the current through each output inductor under the level of the magnetizing current at its lowest amplitude. The fourth technique is controlling the turn off timing of the primary switchers and turn on timing for the secondary synchronous rectifier and in this way to control the energy in the leakage inductance during the dead time in order to build enough energy in the leakage inductance to discharge the parasitic capacitances of the primary switchers to zero. In a given application we may use one or several of these technique function of the operating conditions.

12 Claims, 12 Drawing Sheets

(58) Field of Classification Search
CPC ......... H02M 3/33507; H02M 3/33592; H02M 3/33523; H02M 3/3353; H02M 3/33569; H02M 2001/0058; H02M 3/005; H02M 2003/1557; H02M 3/156; Y02B 70/1425; Y02B 70/1491
See application file for complete search history.

METHOD AND APPARATUS FOR OBTAINING SOFT SWITCHING IN ALL THE SWITCHING ELEMENTS THROUGH CURRENT SHAPING AND INTELLIGENT CONTROL

RELATED APPLICATION/CLAIM OF PRIORITY

This application is related to and claims the priority of Provisional Application No. 62/133,245, filed Mar. 13, 2015, and entitled Method and Apparatus for Obtaining Soft Switching in all the Switching elements through Current Shaping and Intelligent Control; and which provisional application is incorporated by reference herein.

INTRODUCTION AND SUMMARY OF THE PRESENT INVENTION

Some prior concepts have been described on the following applications, (i) "Soft Transition on all Switching elements two transistor forward converter" published PCT application number WO 2014/183132 A1, filed May 12, 2014 (published 13 Nov. 2014, and corresponding US 371 application Ser. No. 14/890,088 filed Nov. 9, 2015), (ii) "Soft switching converter by steering the magnetizing current", published PCT application number WO 2014/183,103 A1, published US application 20140334188 A1, both filed May 10, 2014 (both published 13 Nov. 2014), (iii) "Soft Switching Converter with dual Transformer by Steering the Magnetizing Current" published PCT application number WO 2015/070047 A2, published US application 20150256087 A1, both filed Nov. 7, 2014 (both published 14 May 2015), (iv) "Resonant transition Controlled Flyback" published PCT application number WO 2014/183,095, published US application 20140334194 A1, both filed May 9, 2014 (both published 13 Nov. 2014), and (v) "Soft Switching on all switching elements Converter through Current Shaping (AKA "Bucharest Converter")", PCT published application number WO 2016/007835 A1, published US application 20160020701 A1, both filed Jul. 10, 2015 (PCT published 14 Jan. 2016, US published 21 Jan. 2016), and in that in each of published PCT WO 2016/007835 A1 and published US application 20160020701 A1 the referenced Exhibits A and B correspond substantively to Published PCT applications WO 2014/183132 A1 and WO 2014/183,103 A1, respectively). All of the foregoing applications are incorporated by reference herein.

There are common elements between the present application and all of these previous applications such as the manipulation of the magnetizing current to create zero and slightly negative current through the synchronous rectifiers and turning off the synchronous rectifiers and transferring some of the energy contained in the magnetizing current in the primary and discharging the parasitic capacitances of the primary switchers towards zero voltage. In the application "Soft Switching on all switching elements Converter through Current Shaping (AKA "Bucharest Converter") (published PCT application number WO 2016/007835 A, and published US application 20160020701 A1, both incorporated by reference) and "Soft Transition on all Switching elements two transistor forward converter" (published application WO 2014/183132 A1, incorporated by reference), a current injection is used in a form of a shaped current source to force the current through the synchronous rectifiers to reach zero and after the synchronous rectifiers are turned off at zero current the excess energy contained in the current source will flow into the primary to discharge the parasitic capacitances of the primary switchers towards zero voltage.

In this application we will combine some of these methods together with the resonant discharge produced by the energy contained in the leakage inductance. In the topologies presented in this application the leakage inductance energy is "stored" during the dead time of the primary switchers and then utilized to discharge the parasitic capacitance of the primary switchers. The energy contained in the leakage inductance may be sufficient to discharge the parasitic capacitance of the primary switchers at higher load but may not be enough to do it in the middle range and light load. In some application the leakage inductance energy may not be enough to discharge fully the parasitic capacitances of the primary switchers neither at full load. In one of the embodiments of this patent application the discharge of the parasitic capacitance of the primary switchers will start with the resonant discharge produced by the leakage inductance and after that energy is depleted, we will use the energy contained in the magnetizing inductance in the event the magnetizing inductance reflected in the secondary it is larger than the current flowing through the output choke during that time interval. This will require that the resonant discharge produced by the leakage inductance will be able to get zero voltage switching or near zero voltage switching at loading conditions where the current through the output inductance, I(Lo), it is larger than the magnetizing current reflected in the secondary, IMs.

Because the energy contained in the leakage inductance is proportional with the peak current thought he primary switchers and the peak current is a summation of the current reelected from the secondary and the magnetizing current in the primary IMp, by increasing the magnetizing current we increase the peak current through the primary switchers and as a result we increase the energy stored in the leakage inductance during the dead time, energy necessary to discharge the parasitic capacitances of the primary switchers. By modulating the frequency we modulate the amplitude of the magnetizing current to ensure zero voltage switching conditions at loads wherein I(Lo)>IMs. At lighter loads where I(Lo)<IMs and after the current through the synchronous rectifiers reach zero and they are turned off the magnetizing current is no longer shorted by the conducting synchronous rectifiers and then the current difference between t h e Magnetizing current, IMs, and the current through the output choke will flow into the primary section discharging the parasitic capacitance of the primary switchers.

In another embodiment of this invention is the utilization of the current injection, Iinj, in order to obtain zero voltage switching conditions under all the loading conditions. Initially the discharge of the parasitic capacitance of the primary Mosfets is done by the energy contained in the leakage inductance. During the transition towards zero voltage across the primary of the transformer, a current is injected into the drain of the synchronous rectifier in conduction which will force that current to reach zero. The current through the synchronous rectifier is already decaying towards zero by the change of the voltage in the primary of the transformer during the resonant transition. As a result the amplitude of the current injection it is much smaller by comparison with the current injection method described in published applications WO 2016/007835 A1 and WO 2014/183132 A1, both of which are incorporated by reference. After the current through the synchronous rectifiers in conduction reaches zero the synchronous rectifier is turned off. If the voltage across the primary switchers did not reach zero voltage switching or near zero voltage switching and the current produced by the current injection circuit together with the magnetizing current reflected into the secondary, IMs, is larger than the current flowing through the output choke, then the difference between (Iinj+IMs) and the current through Lo, I(Lo) will flow into the primary to obtain zero voltage switching conditions. The advantage of the current injection is the fact that the necessary energy to discharge the parasitic capacitance is delivered by the current injection circuit in a very short period of time and does not have to circulate through the primary and secondary like the magnetizing current which will increase the conduction losses. In this method we can tailor the amplitude of the current injection just enough to fully discharge the parasitic capacitance of the switching elements. This is done by changing the delay when the current is injected versus the gate signal of the synchronous rectifier.

Thus, in one of its basic aspects, the present invention provides a design and control method for a converter having a transformer and at least one output choke connected to two synchronized rectifiers wherein switching frequency of the converter is controlled in a such way that the current through the synchronous rectifiers becomes zero or slightly negative before the synchronized rectifiers are turned off. Preferably, the current flowing into the drain of the synchronized rectifiers after the synchronized rectifiers turn off will further flow into the primary side and discharging the parasitic capacitances of the primary switchers towards zero and creating zero voltage switching conditions for all the switching elements. Moreover, the converter preferably has a primary side and a secondary side, the transformer has a leakage inductance and a magnetizing current and there are primary switching elements connected to the transformer circuit in the primary side, the primary switching elements having parasitic capacitances across them and synchronous rectifiers in the secondary side; and the switching frequency is tailored in a such way that after the resonant discharge of the parasitic capacitances across the primary switching elements by the energy contained in the leakage inductance after the turn off of one of the primary switching elements the current through said synchronous rectifiers becomes zero or slightly negative at the time wherein the synchronous rectifiers are turned off and the difference between the magnetizing current and the current through the output choke reflects in the primary side, further discharging the parasitic capacitance of the primary switching elements towards zero.

In another of its basic aspects, the present invention provides a design and control method for a converter having a transformer and at least one output choke connected to two synchronized rectifiers and two current sources connected to the drains of the synchronized rectifiers, wherein the current pulses injected into the drain of the synchronized rectifiers forces the current through the synchronized rectifiers to become zero or slight negative before the synchronized rectifiers are turned off. Preferably, the current flowing into the drain of the synchronized rectifiers after the synchronized rectifiers turn off will further flow into the primary side discharging the parasitic capacitances of the primary switchers towards zero and creating zero voltage switching for all the switching elements. Moreover, in a preferred version, the converter has a primary side and a secondary side, the transformer has a leakage inductance and a magnetizing current and there are primary switching elements connected to the transformer circuit in the primary side, the primary switching elements having parasitic capacitances across them and synchronous rectifiers in the secondary side and wherein the current pulses injected into the drain of said synchronous rectifiers are tailored in a such way that after the resonant discharge of the parasitic capacitances across the primary switching elements by the energy contained in the leakage inductance after the turn off of one of the primary switching elements the current through said synchronous rectifiers becomes zero or slightly negative at the time wherein the synchronous rectifiers are turned off and the difference between the magnetizing current plus the current pulses injected into the drain of said synchronous rectifiers and the current through the output choke reflects in the primary further discharging the parasitic capacitance of the primary switching elements towards zero.

In yet another of its basic aspects, the present invention provides a design and control method for at least two converters each one having a transformer having at least one or more output chokes connected to two synchronized rectifiers wherein the switching cycles of said converters are phase shifted and the output chokes are coupled in a such way that the current through said synchronized rectifiers becomes zero or slight negative before said synchronized rectifiers are turned off. Preferably, the current flowing into the drain of the synchronized rectifiers after the synchronized rectifiers turns off will further flow into the primary side of each said converter discharging the parasitic capacitances of the primary switchers towards zero and creating zero voltage switching for all the switching elements.

In still another of its basic aspects, the present invention provides a design and control method for a converter having a transformer and at least one output choke connected to two synchronized rectifiers and two current sources connected to the drains of the synchronized rectifiers, wherein the current pulses injected into the drain of the synchronized rectifiers and the modulation frequency forces the current through the synchronized rectifiers to become zero or slight negative before the synchronized rectifiers are turned off. Preferably, the current flowing into the drain of the synchronized rectifiers after the synchronized rectifiers turns off will further flow into the primary side and discharging the parasitic capacitances of the primary switchers towards zero and creating zero voltage switching for all the switching elements. Moreover, in a preferred version, the converter has a primary side and a secondary side, the transformer has a leakage inductance and a magnetizing current and there are primary switching elements connected to the transformer circuit in the primary side, primary switching elements having parasitic capacitances across them and synchronous rectifiers in the secondary and wherein the amplitude and the phase of current pulses injected into the drain of said synchronous rectifiers and the operation frequency is change is tailored in a such way that after the resonant discharge of the parasitic capacitances across the primary switching elements by the energy contained in the leakage inductance after the turn off of one of the primary switching elements the current through said synchronous rectifiers becomes zero or slightly negative at the time wherein the synchronous rectifiers turn off and the difference from the magnetizing current plus the current pulses injected into the drains of the synchronous rectifiers and the current through the output choke reflects in the primary further discharging the parasitic capacitance of the primary switching elements towards zero.

In another of its basic aspects, the present invention provides a design and control method for a converter having a transformer and at least one output choke connected to two synchronized rectifiers wherein the energy in leakage inductance is boosted by a slight and controlled overlap between the conduction time of the primary switchers and the synchronized rectifiers and said leakage inductance energy is used to discharge the parasitic capacitances of the primary switchers towards zero a and creating zero voltage switching for all the switching elements.

These and other features of the present invention will be further apparent from the following detailed description and the accompanying drawings.

DETAILED DESCRIPTION

Figure 1:
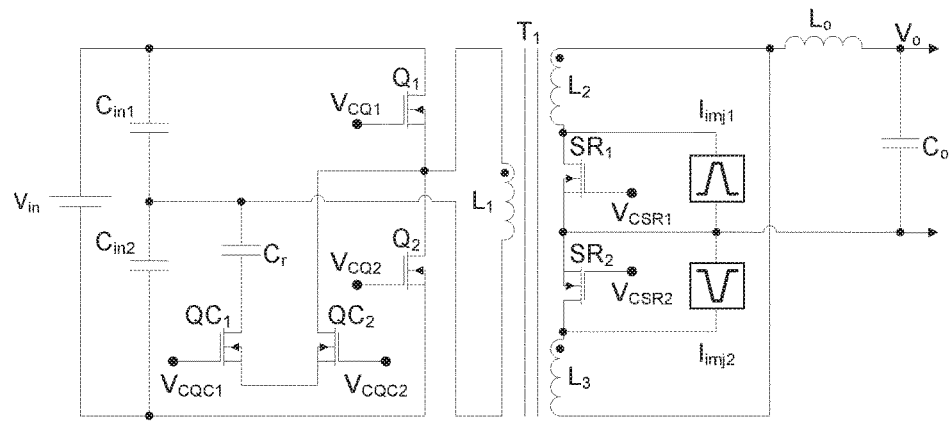
FIG. 1 is an illustration of a circuit with a half bridge topology that implements the principles of the present invention.

In FIG. 1 is presented a half bridge topology composed by primary switchers Q1 and Q2, the capacitor divider Cin1 and Cin2, a transformer T1 with a primary winding L1 and two secondary windings L2 and L3. In the secondary there are two synchronous rectifiers SR1 and SR2, the output inductor Lo and the output capacitor Co. In addition to the standard half bridge topology in the primary we have a clamp capacitor Cr and two mosfets back to back QC1 and QC2 forming a bidirectional switch. In the secondary there are two current injectors Iinj1 and Iinj2 which will inject a narrow pulse of current once they are activated.

Figure 13:
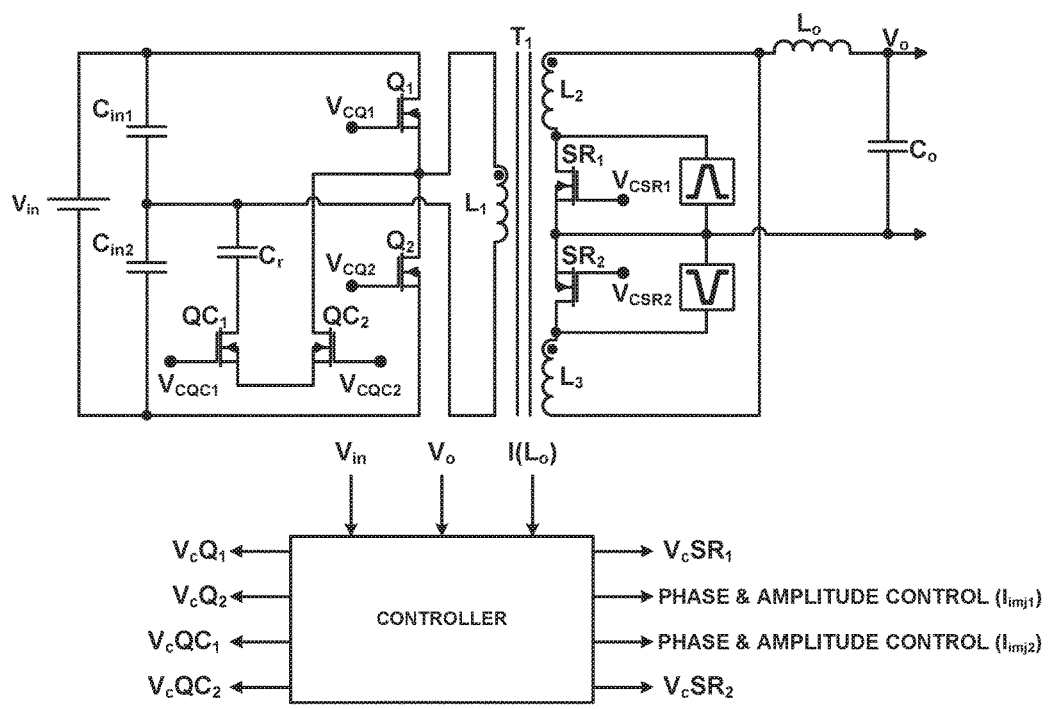
FIG. 13 shows the circuit of FIG. 1, with a controller that is in circuit communication with elements of the circuit of FIG. 1.

In this application, reference to a topology or element being controlled or operated in some fashion means that the topology or element is controlled or operated by a controller, as is readily understood for those in the art. An example of such a controller and the manner in which the controller is in circuit communication with elements of the circuit of FIG. 1 is shown schematically in FIG. 13. It should also be noted that the published application PCT application WO 2014/183095 A1, and published US application 20140334194 A1, both incorporated by reference, also shows the use of a controller for topologies and elements of a topology (e.g. see FIG. 15 of each of those published applications).

Figure 2:
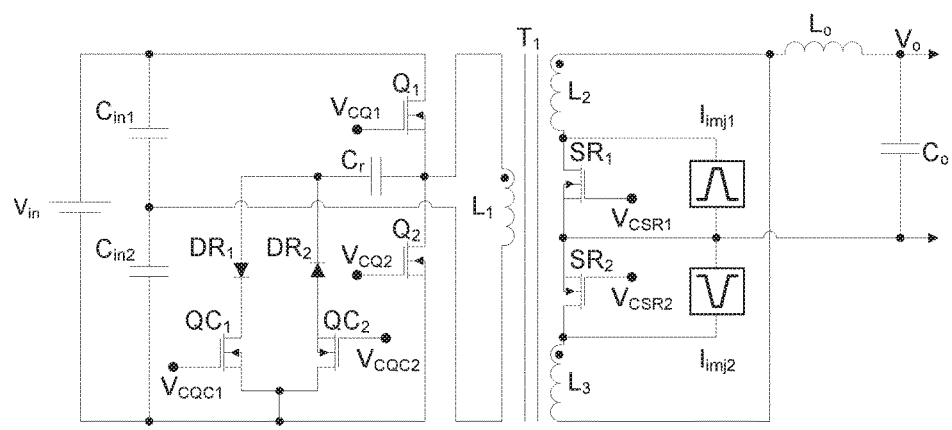
FIG. 2 is an illustration of the half bridge of FIG. 1, with current injection in the secondary and the clamp capacitor Cr in the primary but with a different implementation of the bidirectional switch, all according to the principles of the present invention.

In FIG. 2 is presented the same half bridge with current injection in the secondary and the clamp capacitor Cr in the primary but with a different implementation of the bidirectional switch. Instead of using two Mosfets back to back, in this unique implementation which is one of the embodiments of this invention we are separating the path for current conduction of positive and negative polarity. When the current is flowing into the Cr from the switching node between Q1 and Q2 towards the ground, QC1 is on and the current will flow through DR1. When the current through Cr is flowing through Cr into the switching node between Q1 and Q2, the flow of the current will be through QC2 and Dr2. QC1 can be driven from the ground level and QC2 will have a floating driver. The mode of operation of this clamp circuit is very similar in operation like the implementation in FIG. 1.

Figure 6:
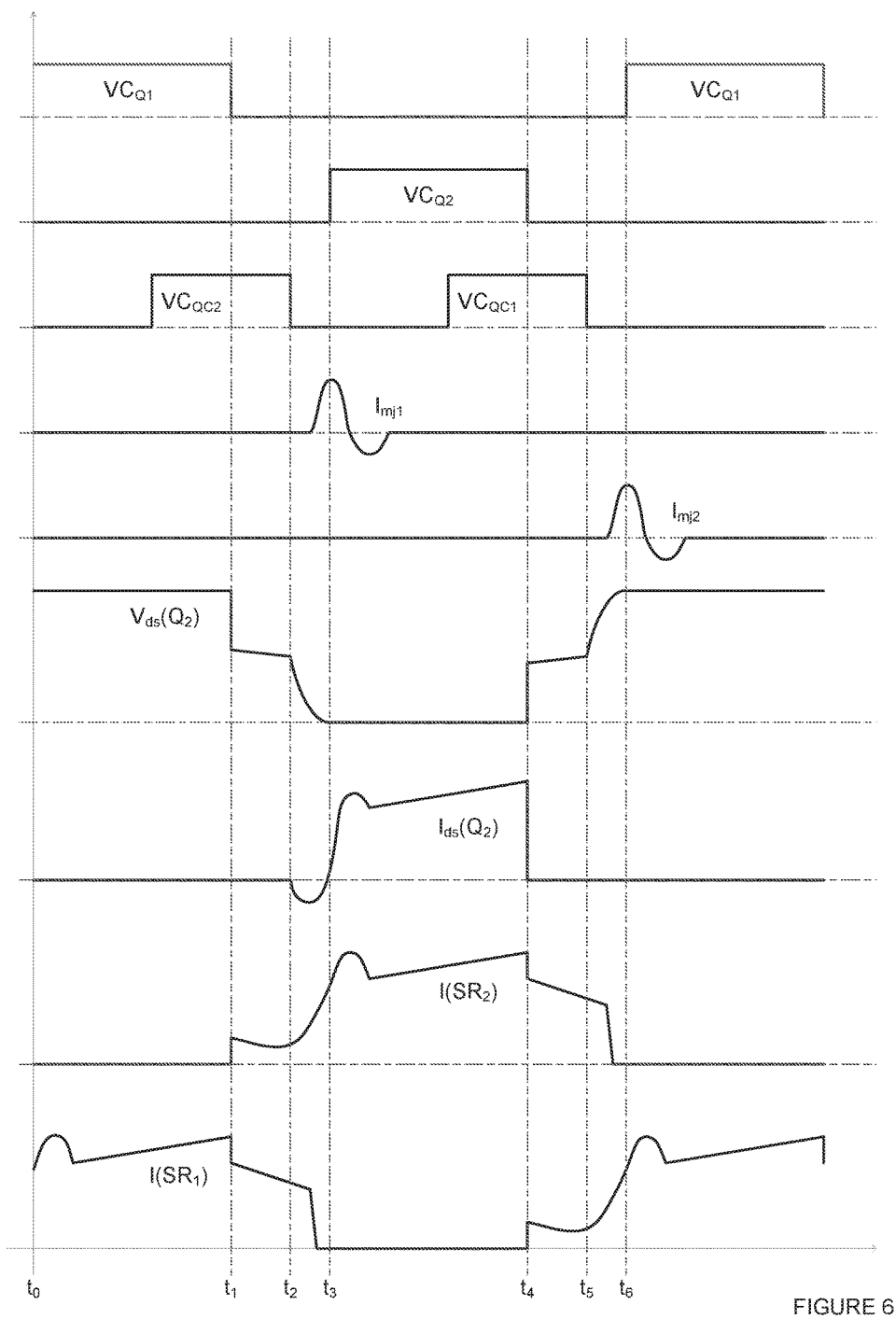
FIG. 6 illustrates the mode of operation of the half bridge with clamp capacitor described in FIG. 2.

In FIG. 6 is presented the mode of operation of the half bridge with clamp capacitor described in FIG. 2. The half bridge topology with a clamp capacitor, as depicted in FIG. 1, but without the current injection was presented by Ionel Marti at PCIM Conference in Nuremberg on May 25, 1998, page 61. The key waveforms presented in FIG. 6 are: the control signal for Q1, VCQ1, the control signal for Q2, VCQ2, the current injection circuits Iinj1 and Iinj2, the voltage across Q2, Vds(Q2), the current through Q2, Ids (Q2), the current through SR2, I (SR2) and the current through SR1, I(SR1).

Between t0 to t1, the switch Q1 is conducting. The current will flow through the primary winding L1 towards the capacitor divider Cin1 and Cin2. In the secondary the current is flowing through L2 and SR1 and the output inductor Lo. During this time interval the energy is transferred form primary to secondary in a forward mode.

At the moment t1 the primary switch Q1 is turned off. The current in the primary will continue to flow through Cr and the QC2 which was turn on in advance as depicted in FIG. 6. The turn on of QC2 can be done anytime during the conduction of Q1. If the resonant frequency between the primary winding and the clamp capacitor Cr is much lower than the operation frequency the current flowing through Cr during t1-t2 interval will continue to flow like in a short circuit. A slight decay of the current flowing through Cr will occur due to the voltage drop across DR1, QC1 and the DC impedances of the synchronous rectifiers. In between t1 to t2 both synchronous rectifiers are conducting, though most of the current will flow through SR1. The decay of the current amplitude through Cr during the time interval t1 to t2 is detrimental to this topology and its mode of operation. It means that the energy contained in the leakage inductance of the transformer decreases and it will make it more difficult to discharge the parasitic capacitances of the primary switchers. To minimize the decay of the current through the clamp capacitor Cr, we have to have a larger value for Cr and a lower impedance QC1, QC2, SR1, SR2 and lower impedance of the primary and secondary windings of the transformer T1.

Figure 7:
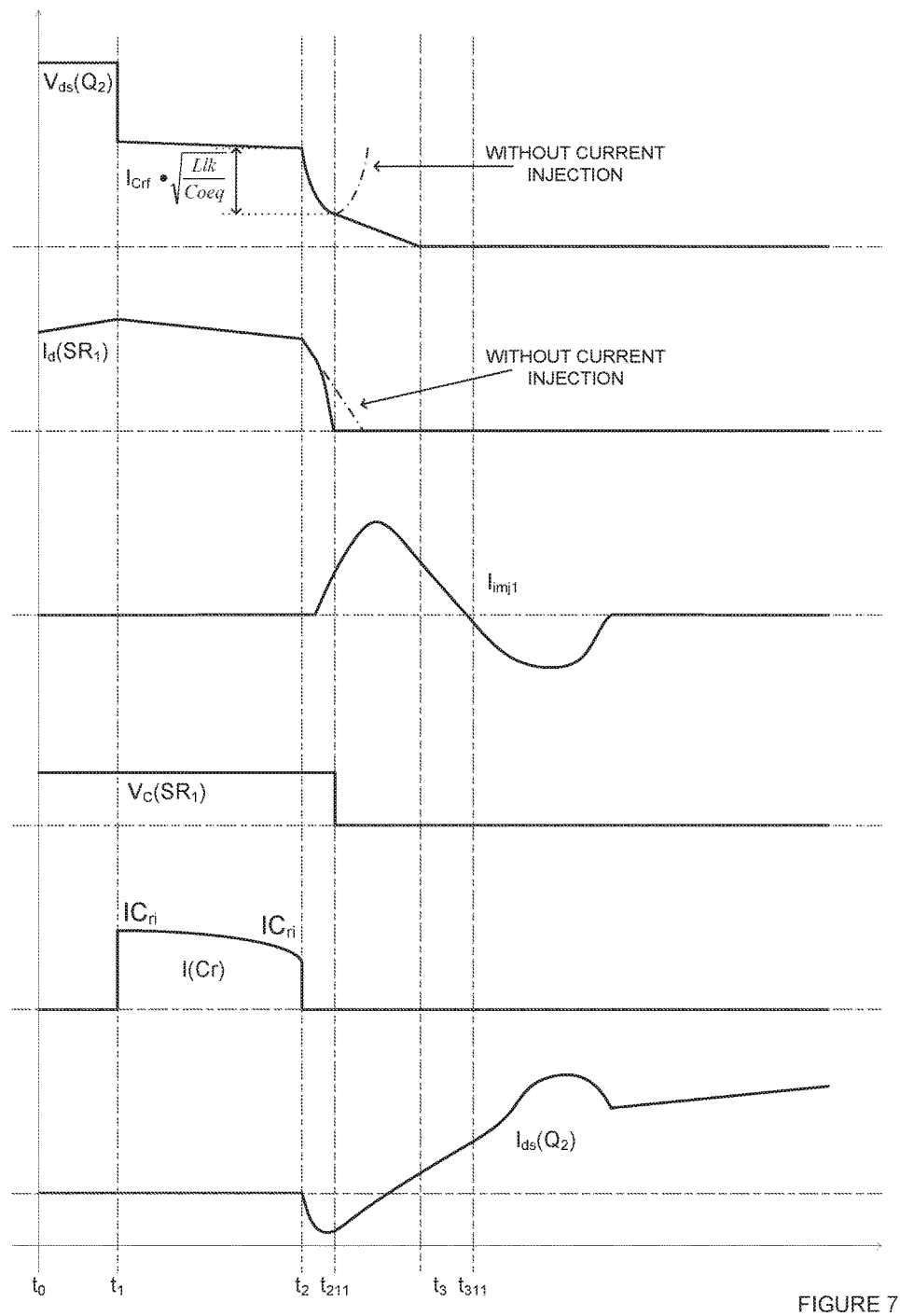
FIG. 7 further illustrates the mode of operation of the present invention.

At t2 QC2 is turned off. This will lead to the resonant discharge of the parasitic capacitance across the primary of the transformer, which includes the parasitic capacitances of Q1, Q2, QC1 and QC2 and also the reflected capacitances from the secondary. All these capacitances are referred in this patent as Coeq. To better explain the mode of operation in this invention I will refer to FIG. 7, wherein the time interval between t2 and t3 is described in more details. The current through Cr at t2 is ICrf and the current through Cr at t1 is ICri. Ideally we would like to minimize the decay of the current through Cr from ICri to ICrf. The decay of voltage across the Q2 during the resonant transition is depicted in FIG. 7 and it is the product between ICrf and the characteristic impedance of the resonant circuit formed by Coeq and the leakage inductance as presented in FIG. 7. For a given Coeq, we would like to increase the leakage inductance and ICrf. A larger leakage inductance does decrease the decay of the current through the synchronous rectifiers during t2 to t3 interval and when the synchronous rectifier will turn off at zero current the reflected voltage from the primary into the secondary together with the leakage inductance will create a resonant circuit with the parasitic capacitance of the synchronous rectifier leading to voltage ringing. It is preferable that the current through the synchronous rectifiers to reach zero and turn off when the current through the leakage inductance is zero which the lowest voltage level of the resonant transition and then to build up the voltage across the synchronous rectifiers in the same time as the voltage in the primary is decaying towards zero.

In FIG. 7 are depicted several key waveforms such as the voltage across Q2, Vds(Q2), the current through SR1, Id (SR1), the control signal for SR1, Vc(SR1), the current through Cr, the current injection and the current through Q2, Ids(Q2).

Between t1 and t2, as depicted in FIG. 7, referred also as a dead time, the current through the synchronous rectifier SR1 is conducting with decay similar with the current through Cr. During the time interval t1 to t2, the leakage inductance current is flowing through Cr, QC2, and Dr2 and in the secondary through SR1 and Sr2.

At t2 the current flowing through Cr will start the resonant discharge and the voltage across Q2 will decay as per formula presented in FIG. 7. In many applications the energy contained in the leakage inductance may not be enough to discharge the parasitic capacitance of the primary switchers to zero. In such cases in one of our embodiments, a current injection applies as per FIG. 7. The current injection will force the current through SR1 to zero and at t211 the SR1 will turn off. The current produced by the current injection circuit plus the magnetizing current minus the output current through output inductor, I(Lo), will reflect into the primary and discharge the parasitic capacitances of the primary switchers facilitating zero voltage switching att3.

Now we are going back to FIG. 6 and time t3. At that time Q2 is turned on at zero voltage switching conditions, the current start flowing through Q2. The bump of current through SR2 is due to the current injection circuit of the implementation described in FIG. 12A, where the energy storage capacitor of the current injection circuit is charged in a resonant way from the transformer. The current will conduct through SR2, which started to conduct with smaller current amplitude already between t1 and t2. Somewhere between t3 and t4, QC1 is turned on.

At t4 Q2 is turned off. The voltage across Q2 will increase relatively fast until reaches the voltage across Cr which is approximately at the level of Vin/2. The current through the leakage inductance is continuing to flow with the slight decay as it was the case between t1 and t2.

Between t4 to t5 the current through SR2 will continue to flow and the current starts to flow also through SR1 decaying the amplitude of the current through SR2. Though sharing the current between synchronous rectifiers during the dead time is a positive thing in this application that is not ideal due to the decay of the current through Cr in the primary.

At t5, QC1 is turned off and the energy contained in the leakage inductance will start discharging the parasitic capacitance of the input switching elements. In between t5 to t6 the current injection Inj2 will deliver additional energy to complete the discharge of the parasitic capacitance in the primary.

Figure 12A:
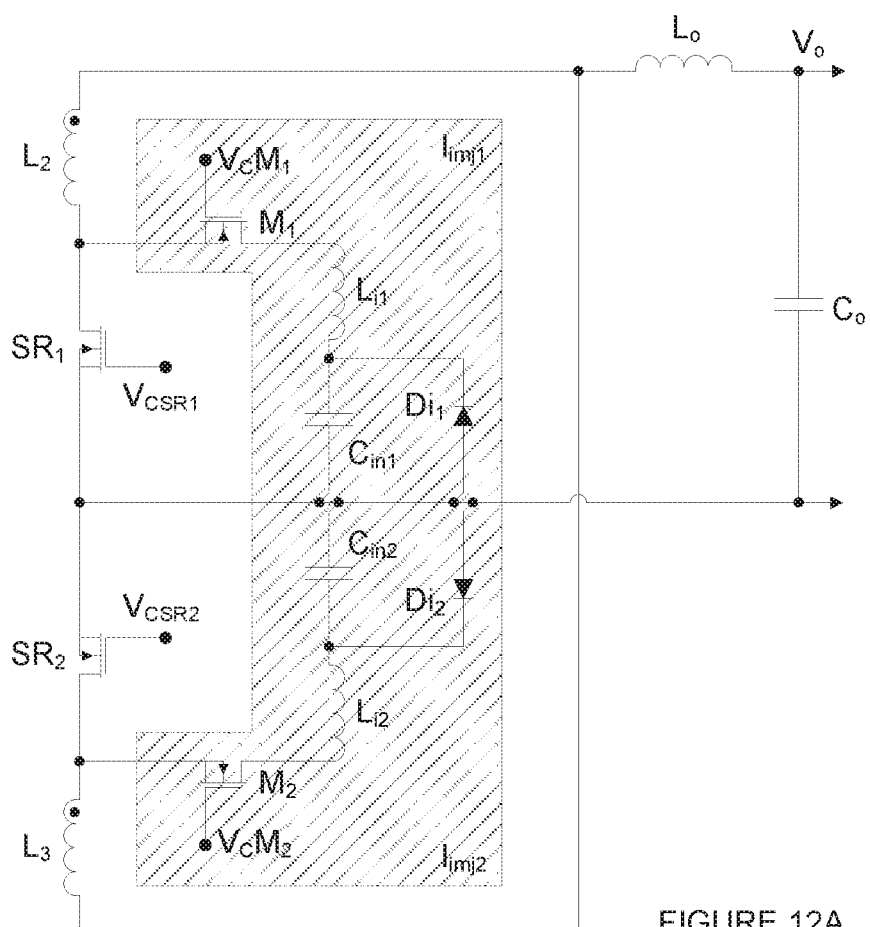
FIGS. 12A, 12B and 12C illustrate an implementation of the present invention that utilizes current injection.

In FIG. 12A is presented the secondary section of the half bridge with clamp capacitor and current injection. The idealized current injector is substituted by one of our preferred implementation. The current injection circuit however can be implemented in many ways and maintaining the spirit of this patent application.

One of the preferred implementation is described in FIG. 12A. The current injection 1, Iinj1 consists of a Mosfet M1, a resonant inductor Li1, a resonant capacitor Ci1 and diode Di1. The n channel Mosfet M1 can be replaced by a p channel Mosfet and in that case it can be driven form the ground level, eliminating a floating drive.

Figure 12B:
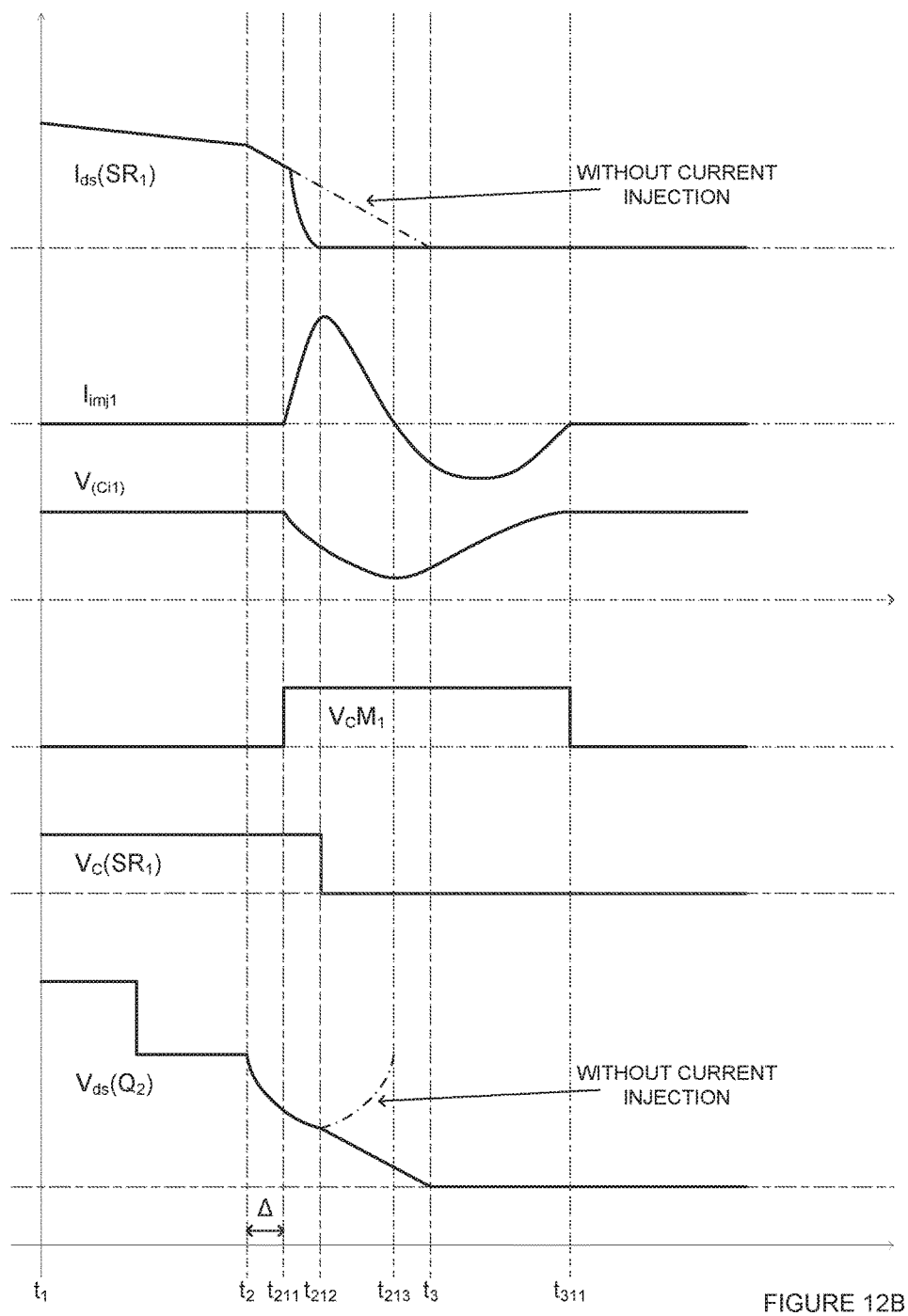
Figure 12C:
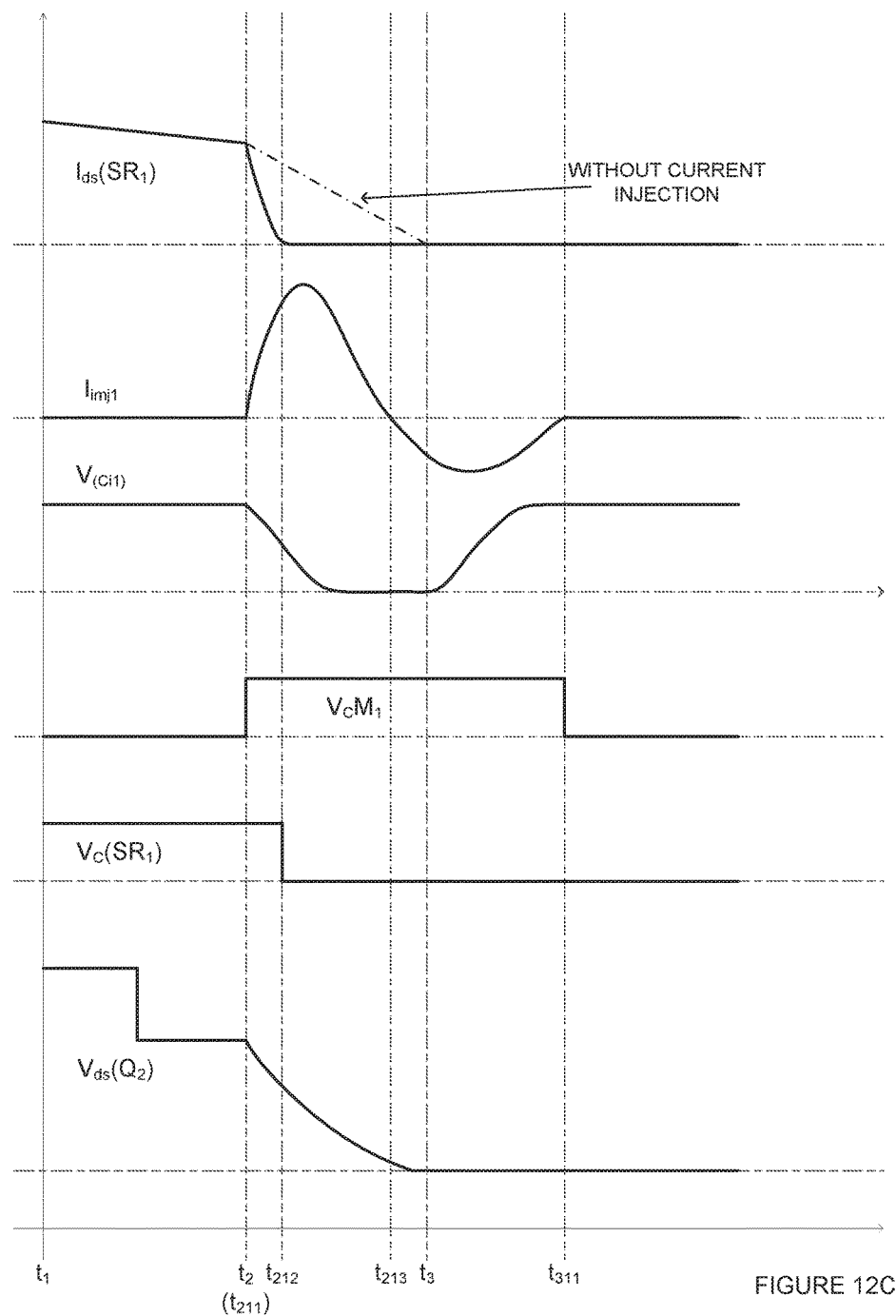

In FIG. 12C is presented one of the current injection modes of operation which applies for higher output current wherein the current injection level has to be higher. In FIG. 12C are depicted the following waveforms: current through SR1, Ids(SR1), the current injection, Iinj1, the voltage across the resonant capacitor of the current injection, V(Ci1), The control signal for the current injection Mosfet, VcM1, the control signal for the SR1, Vc(SR1) and the voltage across Q2, Vds(Q2).

At t2 the QC2 is turned off and the energy contained in the leakage inductance will start discharging the parasitic capacitance of the primary switchers in a resonant manner as presented in FIG. 7. A negative voltage is developed in the secondary across the secondary winding L2 and the current through SR1 starts decaying. Due to the fact that in some conditions the leakage inductance energy is not enough to fully discharge the parasitic capacitances of the primary switchers a current injection circuit is activated by turning on M1. The inductance Li1 and the capacitor Ci1 form a resonant circuit and the current will build up through M1 in a sinusoidal shape starting from zero and reaching a peak current which is defined by the voltage across Ci1 at t2 and the characteristic impedance of the resonant circuit involving Li1 and Ci1. In the same time the voltage across Ci1 is decaying towards zero. When the voltage across Ci1 reaches zero level all the energy contained in Ci1 at t2 is transferred into the resonant inductor. This resonant current will flow through L2 and will force the current through SR1 to decay towards zero, level which is reached at t212 as depicted in FIG. 12C. At that time SR1 is turned off as presented in FIG. 12C, by Vc (SR1). After SR1 is turned off the resonant current flowing through Li1 will flow through L2, L3 and SR2. By design the peak current through Li1 will exceed the current flowing through the output inductor, Lo, minus the magnetizing current reflected in the secondary, IMs, during the time interval t2 to t3. Once the conditions mentioned in the previous sentence occur the excess current will flow into the primary winding and discharge the parasitic capacitance of the primary switchers.

In FIG. 12C is presented one of the current injection modes of operation which applies for higher output current wherein the current injection level has to be higher. In FIG. 12C are depicted the following waveforms: current through SR1, Ids(SR1), the current injection, Iinj1, the voltage across the resonant capacitor of the current injection, V(Ci1), The control signal for the current injection Mosfet, VcM1, the control signal for the SR1, Vc(SR1) and the voltage across Q2, Vds(Q2).

In conclusion at higher output current the amplitude of Iinj1 has to be higher in order to meet the necessary condition Iinj1+IMs>I (Lo) during a portion of the time interval t2 to t3. For lighter loads the current injection amplitude should be smaller in order minimize the unnecessary circulating current and maximize the efficiency.

In order to control the amplitude of the current injection we delay the VcM1. This is presented in FIG. 12B.

At the moment t2, the resonant discharge of the parasitic capacitances across the primary of the transformer T1 starts and the voltage will decay across Q2 in a resonant manner. If the current injection would not be activated, the voltage across Q2, will ring up as depicted in FIG. 12B with dotted line.

The current injection is activated between t2 to t3. For higher output current the current injection is done closer to t2 or even before t2 to have time to decay the current through SR1. Without the current injection the current through SR1 will reach zero later as depicted with dotted line in FIG. 12B, with dotted line. After the synchronous rectifier is turned off, the current produced by the current injection circuit which exceeds the current through output inductor, minus the magnetizing current reflected in the secondary, IMs, will flow into the primary discharging the parasitic capacitance of the primary switchers towards zero as depicted in FIG. 12B by Vds (Q2). If the implementation of the current injected is as presented in FIG. 12A, by shifting the activation of the current injection from t3 towards t2, the amplitude of the current injection will increase. In this way we can tailor the necessary current to discharge the parasitic capacitance of the primary switcher's function of the loading conditions. In FIG. 12B is presented such a case wherein the magnitude of the current injection is reduced by delaying the activation of the current injection.

In FIG. 12B the current injection is activated at t211, at a delay "Δ" from T2. At t212 the current through SR1 reaches zero and SR1 is turned off by Vc(SR1). Due to the lower current amplitude at t211 the time interval between t211 and t212 is shorter. Because of that the resonant cycle is shorted and the voltage across Ci1 does not discharge to zero before the voltage across SR1 will start to rise. This means that just a portion of the energy stored in Ci1 is utilized and as a result the peak current of the Iinj is smaller. For lower output current we further delay VcM1 and in this way we reduce the amplitude of the current injection.

In FIG. 12B and FIG. 12C the current injection reaches zero at t213. The current through Li1 is reversed and the voltage builds up again across Ci1. During this time the energy is transferred from the primary to secondary to charge again Ci1 in a resonant manner. In this implementation the current injection it is working as a quasi-resonant circuit which gets the energy during the on time of the primary switchers and the energy is preserved until the current injection is activated and M1 respectively M2 are turn on again. The energy stored in the Ci1 and Ci2 is used to discharge the parasitic capacitance of the primary switchers after the energy contained in the leakage inductance energy is depleted.

In this embodiment of the invention we are using initially the energy contained in the leakage inductance of the transformer to discharge the parasitic capacitances of the primary switchers, and in some conditions when that energy is not enough we use some or all the energy stored in Ci1 and Ci2 to discharge the parasitic capacitances across the primary switchers through the current injection.

Another key advantage of the current injection is the fact that it will control the turn off of the synchronous rectifiers and charge its parasitic capacitances through a current source preventing the charge of the synchronous rectifiers parasitic capacitances by the leakage inductance when the polarity changes which will lead to oscillation referred also as voltage spikes.

In another embodiment of this invention the discharge of the parasitic capacitances of the primary switchers is done by the energy contained in the leakage inductance and by the magnetizing inductance through a proper timing.

Figure 8:
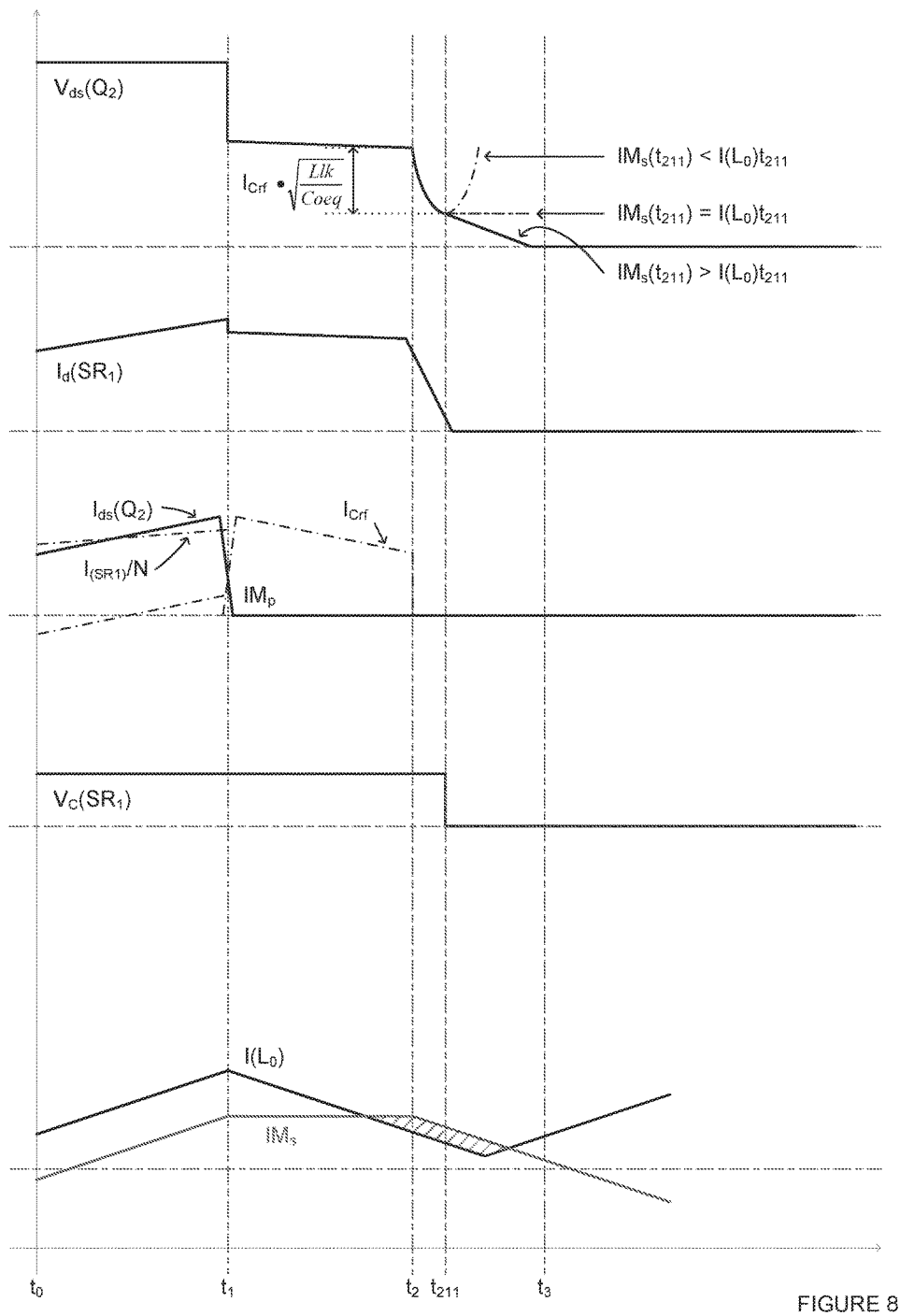
FIG. 8 illustrates several waveforms, for a circuit in accordance with the present invention.

In FIG. 8 are depicted the following waveforms: the voltage across Q2, Vds(Q2), the current through SR1, I(SR1), the current through the primary switch Ids(Q2) and its composition of two currents, the magnetizing current reflected in the primary IMp, and the current through SR1 reflected in the primary, I(SR1)/N, N being the turns ratio of the transformer, the current through Cr, underlining ICrf which is the current through Cr at t21, the control signal for SR1, Vc(SR1) the current through output inductor, I(Lo) and the current through the magnetizing current reflected into the secondary, IMs.

At t0 the switch Q2 is turned on and the current will flow through Q2, the primary of the transformer L1 towards the capacitor divider formed by Cin2 and Cin2 as per FIG. 1 and FIG. 2. In the secondary the current will flow through SR1. The current through the primary has two components. One component is the magnetizing current reflected in the primary, IMp. The other component is the current through the corresponding synchronous rectifier divided by the turn's ratio, N. In FIG. 8 the correspondent synchronous rectifier for Q2 is SR1.

During the time interval between t0 to t1 current is also built up through output inductor Lo. During this time interval the energy it's transferred from the primary to the secondary in a forward mode. In FIG. 8 is also displayed the magnetizing current reflected into the secondary, IMs. The magnetizing current is displayed on the same scale with the current through the output choke. I(Lo).

At t1 the primary switch Q2 is turned off. The primary current will continue to flow through Cr and DR2 because QC2 was already turned on. In the secondary the current continues to flow through SR1 with a slight decay while SR2 will start to conduct slightly. During the time interval t1 to t2 the current through Lo will start decaying, due to the transfer of energy from the output inductor Lo towards output load. The magnetizing current during this time interval, t241 does not change maintaining its amplitude.

At t2 the clamp switch QC2 is turned off. The energy contained in the leakage inductance which is proportional with the square of the current flowing through the leakage inductance at t2 will start the resonant discharge of the parasitic capacitances of the primary switchers between t21 and t211. Somewhere in between t2 and t3 all the energy contained in the leakage inductance is depleted. The resonant discharge of the parasitic capacitances in the primary created a negative voltage in the secondary winding forcing the current through SR1 towards zero. At t211, SR1 is turned off at zero current or near zero current. For conditions wherein the magnetizing current reflected in the secondary is larger than the current through Lo for a portion of the t3-t211 interval, after the SR1 was turned off the parasitic capacitances of the primary switchers will start discharging by the (IMs−I(Lo))/N which represents the reflected current in the primary of the difference between the magnetizing current in the secondary and the current through the output inductor. In the event wherein IMs≤I(Lo) during the time interval t3-t211 then the parasitic capacitances of the primary switchers will not be further discharged and zero voltage switching conditions for the primary switchers cannot be accomplished. To be able to get zero voltage switching conditions or near zero voltage conditions over the entire load and line range we have to modulate the magnetizing current accordingly. We set by design a percentage of the maximum output current, for example 30% and for output currents below that the magnetizing current is designed to be larger than the current through the output inductor for a sufficient potion of t3-t211 time interval. The magnetizing current is controlled by the size of the gap in the main transformer and by the frequency of operation. For output currents larger than the preset limit, in our example 30%, we need to increase the energy contained in the leakage inductance by increasing the peak current thorough the primary switchers at turn off. The magnetizing current reflected in the primary, IMp is a portion of the current through the primary switch. By decreasing the frequency of operation we increase the amplitude of the magnetizing current and as a result we increase the amplitude of the current through the primary switchers and the amplitude of the peak current through these primary switchers at turn off. This will increase the ICrf and as a result the energy contained in the leakage inductance allowing zero voltage switching through the resonant discharge. In some application at full load we may not need to decrease the switching frequency, but as the load decreases and the peak current through the primary switchers decreases we may have in increase the magnetizing current and we do accomplish that by decreasing the operating frequency. At lighter loads when the magnetizing current is larger than the current through Lo the discharge of the parasitic capacitance will be done by the difference between the magnetizing current and the current through output inductor, reflected in the primary.

Figure 9:
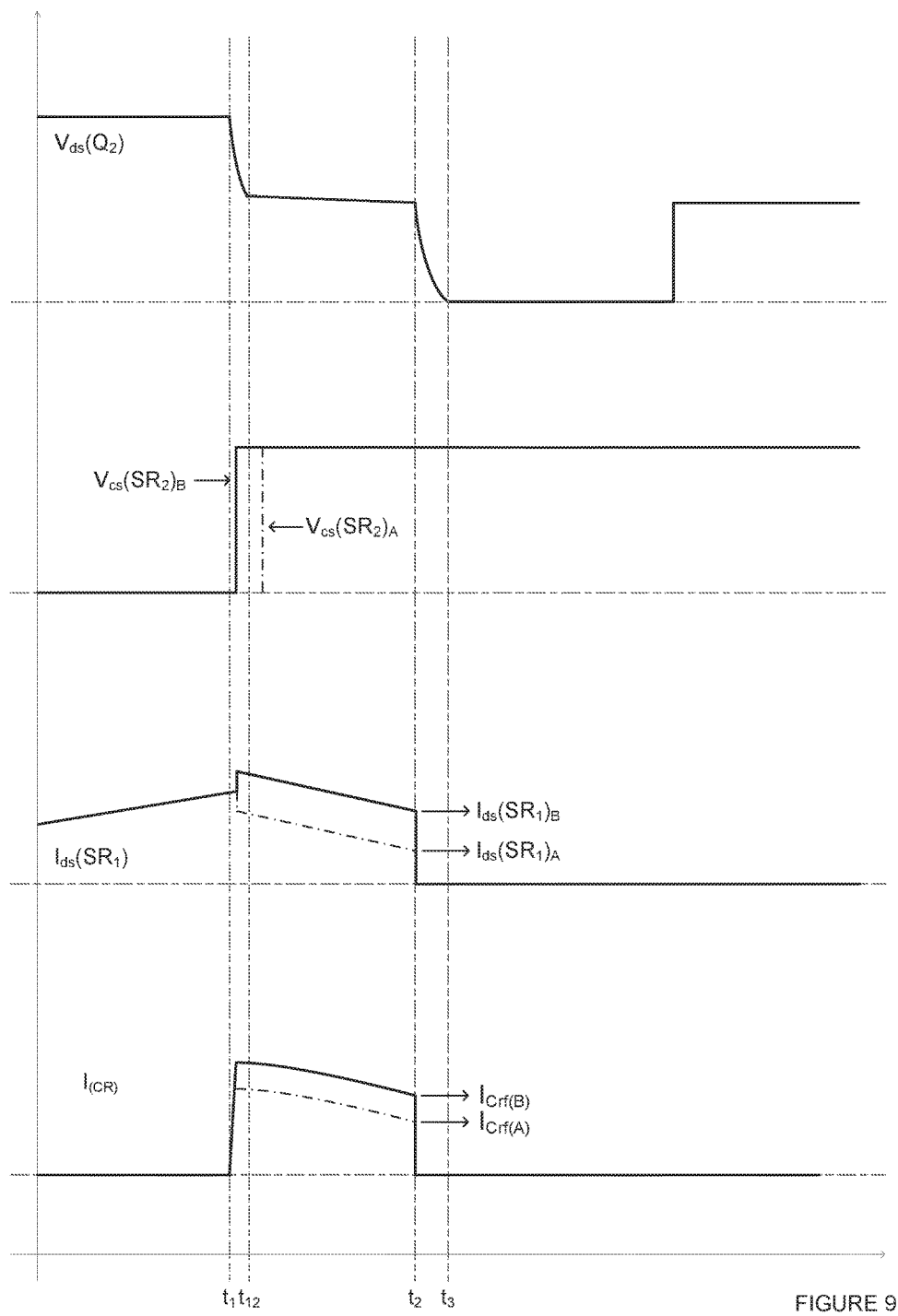
FIG. 9 illustrates additional important waveforms, for circuit topology and operation in accordance with the principles of the present invention.

Another key embodiment of this invention is presented in FIG. 9. The waveforms depicted in FIG. 9 are the voltage across Q2, the control signal for SR2, Vcs(SR2), the current through the SR1, Ids (SR1) and the current through clamp capacitor Cr, I(Cr).

The technique consists in turning on the synchronous rectifier before the voltage across the switching elements reach the level of the capacitor divider which is at approximately Vin/2. In this way some of the energy contained in the parasitic capacitances of the primary switchers is transferred in the leakage inductance by increasing the current through Cr. In the FIG. 9 are presented two cases, one case wherein SR2 is turned on when the voltage across Q2 reaches the middle point, Vin/2, at t12, described as Vcs (SR2)A which will have a corresponding current through SR1 during t1 to t2 period, Ids(SR1)A and a corresponding ICrf(A). The second case is turning on the SR2 earlier at t1 and that will lead to a corresponding current through SR1, Ids(SR1)B and a corresponding current through Cr, ICrf(B) both of them of larger amplitude. By turning on the synchronous rectifier before the voltage across the primary switchers reach the middle point some of the energy is transferred form the parasitic capacitance form the primary to the current through the leakage inductance which will facilitate a resonant discharge to a lower level and obtain zero voltage switching. In the event the synchronous rectifiers turn on even earlier, before the primary switchers turn off, before t1, there will be a very large amount of energy transferred to the leakage inductance energy due to a cross conduction phenomenon limited just by the leakage inductance.

This embodiment of this invention requires a very good resolution in the control. For a very small shift of the synchronous rectifier turn on the amount of energy increase into the leakage energy is relatively large.

In one of the embodiment described in FIG. 8, the magnetizing current should be larger than the current through the output inductor during the transition time t211-t3. This can be accomplished by increasing the magnetizing current but also by decreasing the current through the output inductor during that time period.

Figure 10:
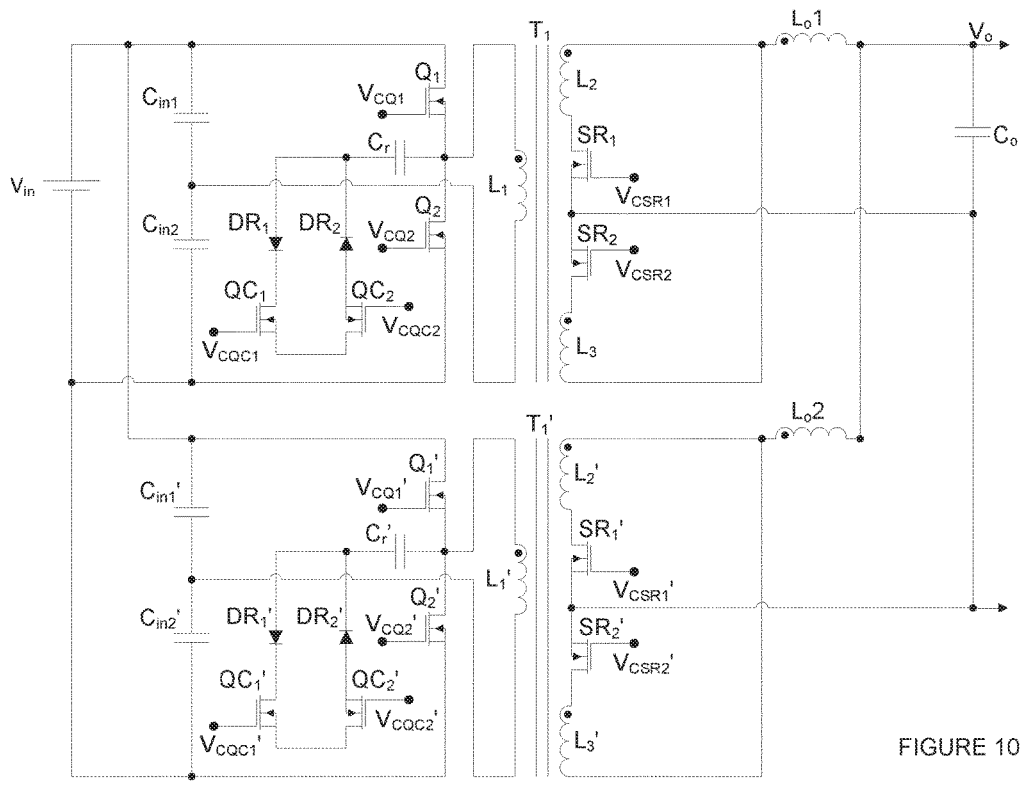
FIG. 10 illustrates a circuit with two half bridges, in accordance with the principles of the present invention.
Figure 11:
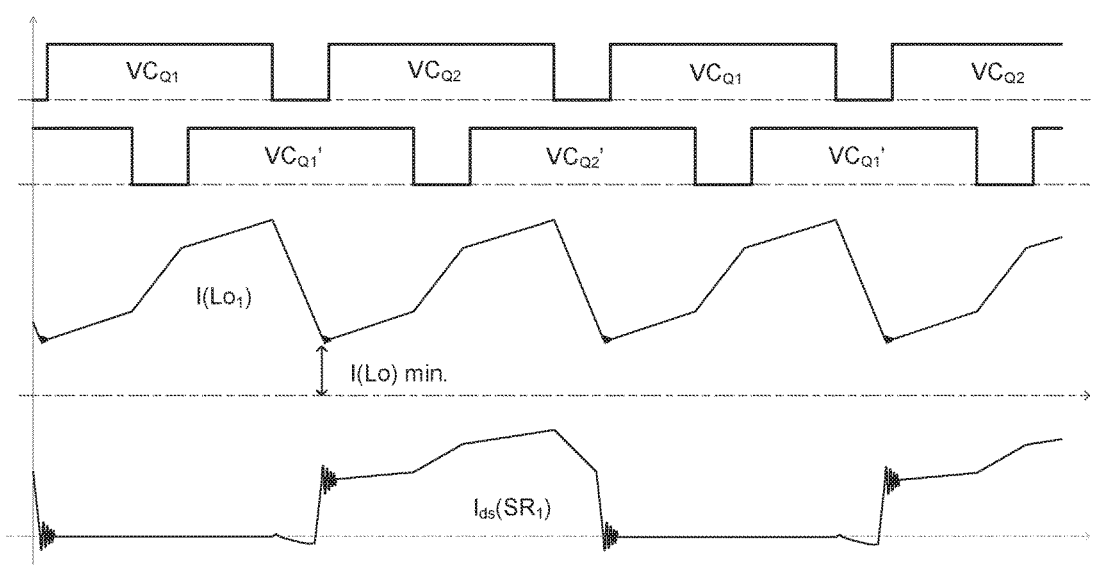
FIG. 11 illustrates waveforms for the first half bridge and the second half bridge in the circuit of FIG. 10.

Such a technique is another embodiment of this invention. In FIG. 10 is presented two half bridges with the clap circuit and these two power trains are interleaved by shifting one of them by half of the period of switching frequency. The key waveforms for the first half bridge and the second half bridge are depicted in FIG. 11. The output inductors of these two half bridges are coupled as presented in FIG. 10. In this coupling technique the inductance for each converter is Lo1 and Lo2 as long as both output voltages provided by the converters are high. This can be seen also in the current through Lo1 depicted in FIG. 1, which has a low slope in such cases. For simplicity we can consider Lo1=Lo2=L. When the output voltage of one of the converter is low, which happened during the dead time, the output inductance seen from the other converter which has a high output voltage is L+L−2*K*L. For a very week coupling (K=0) then these two convertors are acting independent from each other. For a larger coupling the inductance seen by the converter which has a high output voltage it is much smaller when the other converter has a low output voltage as it is the case during the dead time. As a result the dI/dt is larger and the ripple current is higher. A larger ripple current will create the conditions wherein the magnetizing current reflected in the secondary will be larger than the current through the output inductor and that will create the condition described in FIG. 8 for zero voltage switching. The shape of the current through the output inductor will change also the shape of the current through the synchronous rectifiers as depicted in FIG. 11. The same effect can be obtained having two small independent inductors for Lo1 and Lo2 and a larger inductor placed in between the common point of the small inductors and the output.

In this patent we have presented four methods of obtaining zero voltage switching conditions for the primary switchers for a half bridge topology with a clamp circuit.

This methods can be applied in a large variety of topologies such as Forward topology with active clamp, forward-flyback topology with active clamp, asymmetrical half bridge, asymmetrical full bridge, full bridge phase shifted in different configuration as any other topological structure wherein the current flowing through the leakage inductance is preserved during the dead time and that energy is utilized to discharge the parasitic capacitance of the primary switchers prior to the primary switch being turned on. An example of such topology is presented in the published PCT application WO 2014/183095 A1 and published US application 20140334194 A1 "Resonant transition Controlled Flyback" (both published 13 Nov. 2014 and both incorporated by reference).

Figure 3:
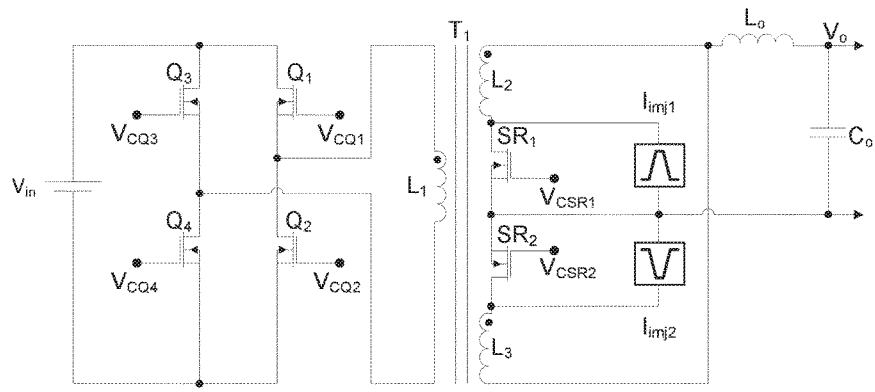
FIG. 3 illustrates a phase shifted full bridge topology with center tap secondary and using current injection, in accordance with the principles of the present invention.

In FIG. 3 is depicted a phase shifted full bridge topology with center tap secondary and using current injection. In full bridge phase shifted topology Q1 and Q2 and respectively Q3 and Q4 are complimentary to each other and the control is done by the phase shift between these two half bridge structures. The leakage inductance energy is preserved by turning on Q3 and Q1, or Q4 and Q2 during the dead time when power is not transferred from primary to secondary. All four methods described in this patent application applied to the half bridge with clamp circuit are applicable for full bridge phase shifted presented in FIG. 3.

Figure 4:
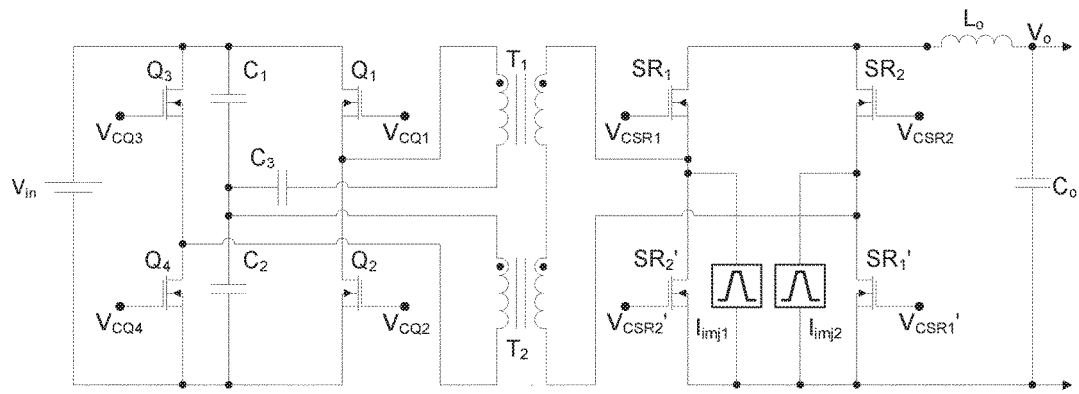
FIG. 4 shows a circuit with two half bridges, in accordance with the principles of the present invention.

In FIG. 4 is depicted two half bridges, one formed by Q1 and Q2 and the transformer T1 and the second one formed by Q3 and Q4 and the transformer T2. The secondary windings of T1 and T2 are in series. The output power is controlled by the phase shift between these two half bridges. In this configuration the voltage in the secondary winding add or subtract function of the phase shift between the two half bridges. In this implementation we are using a full bridge rectification, though center tap can be also used. In the secondary is depicted current injection method though we can use also the magnetizing current as described in FIG. 8 or the rest of the methods described previously.

Figure 5:
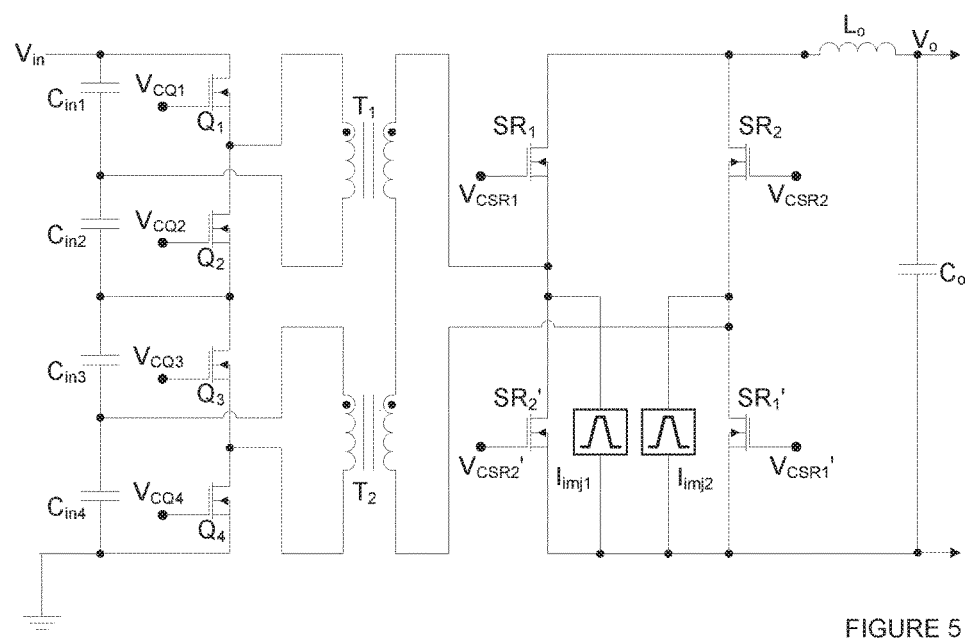
FIG. 5 illustrates circuit topology formed by two half bridges in a totem pole configuration, in accordance with the principles of the present invention.

In FIG. 5 is described to topology formed by two half bridges in a totem pole configuration. Each one has a transformer wherein the secondary winding is in series. The control of the output power can be done through duty cycle control or through phase shift as the topology in FIG. 4. Because the secondary windings are in series the current through the transformer's secondary is the same and as a result the split of the voltage across each half bridge will be equal due to equal currents through the primary.

Thus, from the foregoing detailed description, those in the art will recognize that in one of its basic aspects, the present invention provides a design and control method for a converter having a transformer and at least one output choke connected to two synchronized rectifiers wherein switching frequency of the converter is controlled in a such way that the current through the synchronous rectifiers becomes zero or slightly negative before the synchronized rectifiers are turned off. Preferably, the current flowing into the drain of the synchronized rectifiers after the synchronized rectifiers turn off will further flow into the primary side and discharging the parasitic capacitances of the primary switchers towards zero and creating zero voltage switching conditions for all the switching elements. Moreover, in a preferred version, the converter has a primary side and a secondary side, the transformer has a leakage inductance and a magnetizing current and there are primary switching elements connected to the transformer circuit in the primary side, the primary switching elements having parasitic capacitances across them and synchronous rectifiers in the secondary side; and the switching frequency is tailored in a such way that after the resonant discharge of the parasitic capacitances across the primary switching elements by the energy contained in the leakage inductance after the turn off of one of the primary switching elements the current through said synchronous rectifiers becomes zero or slightly negative at the time wherein the synchronous rectifiers are turned off and the difference between the magnetizing current and the current through the output choke reflects in the primary side, further discharging the parasitic capacitance of the primary switching elements towards zero.

Those in the art will also recognize that in another of its basic aspects, the present invention provides a design and control method for a converter having a transformer and at least one output choke connected to two synchronized rectifiers and two current sources connected to the drains of the synchronized rectifiers, wherein the current pulses injected into the drain of the synchronized rectifiers forces the current through the synchronized rectifiers to become zero or slight negative before the synchronized rectifiers are turned off. Preferably, the current flowing into the drain of the synchronized rectifiers after the synchronized rectifiers turn off will further flow into the primary side discharging the parasitic capacitances of the primary switchers towards zero and creating zero voltage switching for all the switching elements. Moreover, in a preferred version, the converter has a primary side and a secondary side, the transformer has a leakage inductance and a magnetizing current and there are primary switching elements connected to the transformer circuit in the primary side, the primary switching elements having parasitic capacitances across them and synchronous rectifiers in the secondary side and wherein the current pulses injected into the drain of said synchronous rectifiers are tailored in a such way that after the resonant discharge of the parasitic capacitances across the primary switching elements by the energy contained in the leakage inductance after the turn off of one of the primary switching elements the current through said synchronous rectifiers becomes zero or slightly negative at the time wherein the synchronous rectifiers are turned off and the difference between the magnetizing current plus the current pulses injected into the drain of said synchronous rectifiers and the current through the output choke reflects in the primary further discharging the parasitic capacitance of the primary switching elements towards zero.

Additionally, those in the art will recognize that in yet another of its basic aspects, the present invention provides a design and control method for at least two converters each one having a transformer having at least one or more output chokes connected to two synchronized rectifiers wherein the switching cycles of said converters are phase shifted and the output chokes are coupled in a such way that the current through said synchronized rectifiers becomes zero or slight negative before said synchronized rectifiers are turned off. Preferably, the current flowing into the drain of the synchronized rectifiers after the synchronized rectifiers turns off will further flow into the primary side of each said converter discharging the parasitic capacitances of the primary switchers towards zero and creating zero voltage switching for all the switching elements.

Still further, those in the art will recognize that in still another of its basic aspects, the present invention provides a design and control method for a converter having a transformer and at least one output choke connected to two synchronized rectifiers and two current sources connected to the drains of the synchronized rectifiers, wherein the current pulses injected into the drain of the synchronized rectifiers and the modulation frequency forces the current through the synchronized rectifiers to become zero or slight negative before the synchronized rectifiers are turned off. Preferably, the current flowing into the drain of the synchronized rectifiers after the synchronized rectifiers turns off will further flow into the primary side and discharging the parasitic capacitances of the primary switchers towards zero and creating zero voltage switching for all the switching elements. Moreover, in a preferred version, the converter has a primary side and a secondary side, the transformer has a leakage inductance and a magnetizing current and there are primary switching elements connected to the transformer circuit in the primary side, primary switching elements having parasitic capacitances across them and synchronous rectifiers in the secondary and wherein the amplitude and the phase of current pulses injected into the drain of said synchronous rectifiers and the operation frequency is change is tailored in a such way that after the resonant discharge of the parasitic capacitances across the primary switching elements by the energy contained in the leakage inductance after the turn off of one of the primary switching elements the current through said synchronous rectifiers becomes zero or slightly negative at the time wherein the synchronous rectifiers turn off and the difference from the magnetizing current plus the current pulses injected into the drains of the synchronous rectifiers and the current through the output choke reflects in the primary further discharging the parasitic capacitance of the primary switching elements towards zero.

Moreover, those in the art will recognize that in another of its basic aspects, the present invention provides a design and control method for a converter having a transformer and at least one output choke connected to two synchronized rectifiers wherein the energy in leakage inductance is boosted by a slight and controlled overlap between the conduction time of the primary switchers and the synchronized rectifiers and said leakage inductance energy is used to discharge the parasitic capacitances of the primary switchers towards zero a and creating zero voltage switching for all the switching elements.

With the foregoing disclosure in mind, the manner in which various topologies can be designed and controlled to produce soft switching in all switching elements through current shaping and intelligent control will be apparent to those in the art.

The invention claimed is:

1. A method for operating a DC-DC converter,
   the converter including
      a primary side and a secondary side,
      a transformer,
      at least two primary switching elements in the primary side,
      at least two synchronous rectifiers in the secondary side,
      at least one output inductor, and
      at least two current-injection sources,
   the method comprising:
      when at least one of the at least two primary switching elements, which was conducting, is turned off, achieving a first amplitude of a first current to be above a second amplitude,
         wherein the second amplitude is the lowest amplitude of a current passing, in operation of the converter, through the at least one output inductor,
         wherein the first current includes a magnetizing current of the transformer;
      causing a second current, that passes through at least one of the at least two synchronous rectifiers, to become negative, and
      turning off the at least one of the at least two synchronous rectifiers the
      second current through which has become negative; and
      (i) after a pre-determined time interval, turning on the at least one of the at least two primary switching elements, which was off when the at least one of the at least two synchronous rectifiers was turned off, under zero voltage switching conditions.

2. The method according to claim 1, wherein the achieving the first amplitude of the first current comprises:
   achieving the first amplitude of the first current that includes a sum of
      (a) the magnetizing current, and
      (b) a third current of the at least one of two current injection sources,
   wherein each of said two current injection sources being connected to a drain of a corresponding one of the at least two synchronous rectifiers,
   wherein each of said two current injection sources is an amplitude-controlled and phase-controlled current injection source.

3. The method according to claim 2,
   wherein said achieving is caused by adjusting amplitude and phase of the third current injected into drains of the at least two synchronous rectifiers; and
   wherein said achieving occurs after a resonance discharge of parasitic capacitances, formed across the at least two primary switching elements, by energy contained in a leakage inductance of the transformer.

4. The method according to claim 2,
   wherein said achieving is caused by adjusting
      (a) amplitude and phase of the third current, injected into drains of the at least two synchronous rectifiers; and
      (b) a switching frequency of the converter,
   and
   wherein said achieving occurs after a resonant discharge of parasitic capacitances, formed across the at least two primary switching elements, by energy contained in a leakage inductance of the transformer.

5. The method according to claim 4, further comprising:
   flowing a current, passing into a drain of a synchronous rectifier from the at least two synchronous rectifiers, into the primary side of the converter
      to discharge the parasitic capacitances and
      to create zero voltage switching conditions for all switching elements of the converter.

6. The method according to claim 1,
   wherein said achieving is caused by adjusting a switching frequency of the converter; and
   wherein said increasing occurs after a resonant discharge of parasitic capacitances, formed across the at least two primary switching elements, by energy contained in a leakage inductance of the transformer.

7. The method according to claim 6, further comprising:
   flowing a current, passing into a drain of a synchronous rectifier from the at least two synchronous rectifiers, into the primary side of the converter
      to discharge the parasitic capacitances and
      to create zero voltage switching conditions for all switching elements of the converter.

8. The method according to claim 1, wherein said operating is carried out with the converter configured in a half-bridge topology, in which:
   in the secondary side:
      the transformer has two secondary windings, each of the two secondary windings having an inner terminal and an outer terminal;
      each of said at least two synchronous rectifiers has a first lead and a second lead, first leads of the at least two synchronous rectifiers connected to one another at a first connection point;
      each of inner terminals of the two secondary windings connected to respectively corresponding second leads of the at least two synchronous rectifiers at second and third connection points, respectively;
      outer terminals of the two secondary winding connected to the at least one output inductor at a fourth connection point, which is further connected to a capacitor at a fifth connection point;
      a series of the first and second of the at least two current injection sources is connected between the second and third connection points
   in the primary side:
      two Mosfets are connected in a totem pole configuration circuit, wherein a drain of a first Mosfet is connected to a source of a second Mosfet, said totem pole configuration circuit being connected across an input voltage source, wherein a capacitor divider is connected across the input voltage source, wherein a clamp circuit is formed by the two Mosfets connected together at the input voltage source in series with a clamp capacitor, wherein said clamp circuit is connected in between a common connection of said two Mosfets and a common connection of said capacitor divider, and wherein a primary winding of said transformer is connected between said common connection of the capacitor divider and the common connection of the two Mosfets.

9. The method according to claim 1, wherein said operating is carried out with the converter configured in a half-bridge topology with an active clamp capacitor.

10. The method according to claim 1, wherein said operating is carried out with the converter configured in a full bridge topology.

11. The method according to claim 1, wherein said operating is carried out with the converter configured in a phase shifted full bridge topology.

12. The method according to claim 1, wherein said operating is carried out with the converter formed by two half-bridges in a totem configuration; the transformer has two secondary windings, each of the two secondary winding having an inner terminal and an outer terminal;

each of said at least two synchronous rectifiers has a first lead and a second lead, first leads of the at least two synchronous rectifiers connected to one another at a first connection point;

each of inner terminals of the two secondary windings connected to respectively corresponding second leads of the at least two synchronous rectifiers at second and third connection points, respectively;

outer terminals of the two secondary winding connected to the at least one output inductor at a fourth connection point;

and a series of the first and second of the at least two current injection sources is connected between the second and third connection points.

* * * * *